United States Patent [19]

Proakis et al.

[11] Patent Number: 5,301,167
[45] Date of Patent: Apr. 5, 1994

[54] APPARATUS FOR IMPROVED UNDERWATER ACOUSTIC TELEMETRY UTILIZING PHASE COHERENT COMMUNICATIONS

[75] Inventors: John G. Proakis, Lexington; Josko Catipovic, Woodshole; Milica Stojanovic, Boston, all of Mass.

[73] Assignees: Northeastern University, Boston; Woods Hole Oceanographic Institution, Wood Hole, both of Mass. ; a part interest

[21] Appl. No.: 926,223

[22] Filed: Aug. 5, 1992

[51] Int. Cl.$^5$ ............................................. H04B 11/00
[52] U.S. Cl. .................................................... 367/134
[58] Field of Search ................ 367/134; 375/6; 455/40

[56] References Cited
U.S. PATENT DOCUMENTS 5,029,147 7/1991 Andrews et al. .................... 367/134

OTHER PUBLICATIONS

McGraw-Hill Encyclopedia of Science & Technology, 1982, pp. 644-647.

Primary Examiner—Daniel T. Pihulic
Attorney, Agent, or Firm—Robert K. Tendler

[57] ABSTRACT

An underwater acoustic communications system utilizes phase coherent modulation and demodulation in which high data rates are achieved through the use of rapid Doppler removal, a specialized sample timing control technique and decision feedback equalization including feedforward and feedback equalizers. The combined use of these techniques drammatically increases data rates by one and sometimes two orders of magnitude over traditional FSK systems by sucessfully combating fading and multipath problems associated with a rapidly changing underwater acoustic channel that produce intersymbol interference and make timing optimization for the sampling of incomming data impossible.

20 Claims, 6 Drawing Sheets

APPARATUS FOR IMPROVED UNDERWATER ACOUSTIC TELEMETRY UTILIZING PHASE COHERENT COMMUNICATIONS

FIELD OF INVENTION

This invention relates to underwater communications and more particularly to a system for optimizing digital communications through the utilization of both phase coherent modulation and demodulation along with specialized coding and decoding techniques involving combined equalization, phase estimation and symbol synchronization.

BACKGROUND OF THE INVENTION

Achieving reliable high data rate communications over long range underwater acoustic channels is achievable only if one can detect and rapidly account for the very rapid changes in the underwater acoustic channel. In the Past acoustic communication has only been possible with slower incoherently demodulated frequency shift keying (FSK). While coherent PSK systems have been used to transmit data, they have only been used in a vertical direction in deep water applications where no multipath or channel fluctuations occur.

Assuming the harsh marine environment can be overcome, a high data rate digital underwater communications system has instant application to military surveillance, pollution monitoring, production oil field control, command and monitoring, remote sensing and even scuba diver communications. To date such applications are limited primarily due to signal fading and multipath problems as well as turbulence and Doppler induced artifacts, which severely limit realization of any practical system.

To understand the difficulties of underwater communication, it will be appreciated that the underwater acoustic channel is characterized as a time dispersive, rapidly fading channel, which in addition exhibits Doppler effects. Also, a major obstacle for satisfactory synchronization is the time varying intersymbol interference (ISI) and Doppler shifts associated with moving vehicles.

As will be appreciated, underwater acoustic data telemetry is thus a taxing problem because many unique channel characteristics such as fading, extended multipath, and refractive properties of the sound channel preclude direct applications of classical communication techniques. Over the years there have been many attempts to design a reliable acoustic link, largely by grafting methods developed for other channels. Many of these approaches fail in the aquatic environment. Of particular interest is the failure of frequency shift keying to provide bandwidth efficiency for high data rates.

The following describes both the harsh environment for underwater acoustic communications and several prior techniques attempting to combat the problems associated with the harsh environment.

I. ACOUSTIC CHANNEL BEHAVIOR

The ocean acoustic channel creates strong amplitude and phase fluctuations in acoustic transmissions. The fluctuations are induced by internal waves, turbulence, temperature gradients, density stratification, and related phenomena causing local perturbations in the sound speed. These interact with the transmitted wave fronts through diffractive and refractive effects, causing temporal, spatial, and frequency-dependent fluctuations in the received waveforms. In addition, there exist multiple propagation paths from transmitter to receiver in most underwater propagation geometries. In the deep ocean these are described as rays or wave guide modes, and in shallow water, also as reflections from discrete and distributed scatterers. Received signal fluctuations arise from medium fluctuation along a single path (micromultipath) and time-variant interference between several propagation paths (macromultipath). The scintillation behavior and its effect on data transmission naturally decompose into single-path fading and the multipath effect consideration brought about by the dispersion relation and the effects of channel boundaries

A. Single-Path Fluctuation

The effects of fading channels on data transmission are well known. Amplitude and phase fluctuations increase the selection and performance of signaling techniques, for instance, MFSK.

The questions of primary interest are the types of ocean acoustic channels with fluctuation levels sufficiently low to permit coherent signaling, and the temporal, frequency, and space-dependence of the received pressure field. The telemetry system designer is driven to employ a coherent system for greater data throughput, but the sensitivity issues of coherently demodulated systems to channel fluctuations up until the present invention were thought to require more robust incoherent demodulation. Priorly it was thought that coherent signaling could be used only in applications where the fluctuation level and dynamics were sufficiently low to permit coherent carrier acquisition and tracking. Thus it was thought that strong medium fluctuations precluded coherent carrier-phase tracking.

Acoustic fluctuation is a function of range and frequency. The principal fluctuation mechanisms over the long range deep water channel are internal waves governed by the Garret-Mink power spectrum and homogenous isotropic turbulence. Turbulence dominates the region above 10 kHz and under 10 km.

The above reflects typical fluctuation behavior. Extremal channel behavior is of interest to acoustic telemetry designers because the systems are designed to operate under many channel conditions, and a system breakdown due to an infrequent but severe event is unacceptable.

While their requirements are tempered by past experiences of operating at sea, models of typical fluctuations are inadequate, and systems designed for average channel behavior suffer in overall performance and robustness. Given the lack of success of modeling, there is a requirement for a system which can accommodate the severe marine environment which is model independent.

B. Multipath

The relatively slow sound speed in the ocean gives rise to extended multipath structures. The SOFAR channel in the deep ocean and many coastal and harbor environments have characteristic reverberation times from tens of milliseconds to several seconds, and the time variant multipath must be recognized as a basic channel characteristic, present in all but few propagation paths of interest.

For instance, the SOFAR (sound ocean fixing and ranging) channel yields a number of distinct arrivals for source-receiver separations of one convergence zone or greater. A typical multipath spread is on the order of 1 s, with individual path RMS fluctuation of approximately 10 ms.

At short ranges, reflections from objects and channel boundaries dominate the multipath; the problem becomes geometry-specific and no generic solutions are available. It is important to note that multipath itself is not the fundamental performance constraint for acoustic telemetry systems. Rather, a single-path temporal fluctuations and multipath time stability are primary performance problems.

C. Sound Attenuation and Transmission Loss

Waveguide characteristics of the underwater channel introduce a strong spatial dependence into the received signal level for the deep-water channel, and for the shallow-water environment. Acoustic attenuation is governed by the source-receiver separation, channel waveguide characteristics, and frequency-dependent absorption. While generic approximations for transmission loss (TL) and the channel transfer functions exist, today's numerical propagation modeling techniques are capable of accurate transmission loss, impulse response, and boundary-scattering transmission loss, impulse response, and boundary-scattering predictions. Careful source-receiver positioning can yield large (e.g., 40 dB) improvements in the received signal power. On the other hand, "shadow zones," i.e., regions with unusually high transmission loss, represent volumes from which acoustic telemetry is practically impossible. Note, sound absorption is the most stringent limitation On the carrier frequency and available system bandwidth, as rapid attenuation of higher frequencies imposes a maximum frequency limit for a telemetry system.

Transmission loss due to geometrical spreading and waveguide features introduces strong spatial and spectral dependence on the pressure level of the received waveforms. In fact, there are geometric configurations in many ocean channels where data telemetry is infeasible due to the excessive transmission loss from in situ sound velocity profiles and bottom bathymetry data can predict the occurrence and extent of these "shadow zones," guide system placement, and/or dictate times when a link can be expected to fail. Automatic repeat request, spatial and frequency diversity, as well as telemetry networking, can be used to overcome the transmission loss fluctuations, but lead to rather complex implementations.

Spatial and spectral variability of the received signal level pose particular problems when the source and/or receiver are moving; for example, when communicating with a moving remotely operated vehicle (ROV). The channel fluctuation then poses fundamental convergence problems to receiver equalizers and echo processors. Incidentally, Doppler shifts caused by relative motion are much simpler to tract and compensate for than the spatial variability of the channel transfer function.

D. Ambient Noise

Ambient ocean-noise influences the received signal-to-noise ratio and largely controls transmitter power. It generally decreases in frequency over the range of interest, forcing the designer to operate as close to the attenuation limit as possible. In general, the low cutoff of the data band is determined by the ambient noise spectrum and the high point by absorption considerations. Inshore environments and marine worksites are as a rule much noisier than the deep-ocean environment, and the system designer is faced with selecting realistic worst-case performance conditions and robust criteria for the system.

In the 10–20-kHz band used by many acoustic telemetry systems, the dominant noise-generating mechanism is due to resonant air bubbles introduced primarily by braking waves or rain. For instance, the observed 14.5-kHz resonance peak due to rain results from bubbles of 0.22 mm radius. A breaking wave induces a strong acoustic noise field in its vicinity; during significant wavebreaking activity, the ambient noise level can increase significantly, and the suspended bubbles slow the sound speed to create a near-surface waveguide which increases the resultant sound level at the surface. Receivers deployed near the surface are particularly amenable to wave-caused noise, as th attendant mooring or ship is often a cause of significant bubble action. For near horizontal paths, forward scattering and attenuation caused by the bubble layer are significant factors. Vertical propagation interference is largely due to bubble ambient noise. Propagation interference becomes an issue only when the receiver is enveloped in a bubble plume, which causes serious data degradation. This phenomenon is particularly noticeable when operating from a maneuvering ship, such as tracking and communicating with a fast-moving ROV.

The above littany of problems with underwater acoustic communications explains in part why prior systems for underwater communications have failed to provide reliable underwater communications at sufficiently high data rates.

There is therefore a need for a robust acoustic telemetry system, designed with careful consideration to channel characteristics. Grafting communication techniques developed for more benign channels invariably results in unacceptable sensitivity to realistic channel behavior.

II DATA TRANSMISSION SYSTEMS

This section explores telemetry techniques required for a robust data link designed for realistic ocean channels.

The channel characteristics, and hence the system designs, can be grouped into three categories.

A. Long-Range Systems

Long-range systems from 20 to 2000-km range in deep water have an upper frequency limit between 500 Hz to 10 kHz, and the attenuation requires transmitted power levels to excess of 190 dB re $\mu$Pa. The channel-phase stability over many propagation geometries in this range is rather good, and phase-coherent methods can be used. Generally, the main problem is transmitting enough power to overcome the high transmission loss and using signal coding to maximize the received signal reliability per bit. The long-range acoustic channel is a very complex waveguide; the high spatial TL variability requires either that the system be operated in regions where the channel fluctuations are low, or that real-time channel nowcasting and forecasting models be integrated into system operation.

The classical sonar equation is a useful first design check. For a 1000-km-deep-water, 1 b/s telemetry system at 220 Hz, it is given by $$SNR = SL - \alpha R - TL - NL$$
$$0 = 190 - 10 - 120 - 60$$

where a 100-w source level (SL) and an ambient noise level (NL) of 60 dB re μPa are assumed. The attenuation loss xR at this frequency and range is 10 dB. The resulting bit SNR (for a 1 b/s system) along any single-ray path is 0 dB, and the system is on the operational threshold. Considering the entire arrival of some 20 rays increases the SNR by 26 dB, but only if the receiver is capable of coherently processing the multiple arrivals. As the ocean multipath structure is generally quite dynamic, this is not a simple task. For example, an adaptive recursive least squares (RLS) equalizer is likely to encounter convergence problems when a channel impulse response changes significantly in less than 10 impulse response durations, and this bound is often approached by ocean channels. Also, the SNR per path available is marginally adequate to insure equalizer convergence. The bit SNR can be improved by using directive arrays at the transmitter and/or receiver. In practice, 20 dB or more of array gain is easily attainable, although the hardware and associated pointing issues make for more complex systems. Using narrow transmitter arrays allows use of a single eigenray path for propagation and alleviates the channel equalizer and multipath problems, but the transmitter needs to know and update the eigenray direction.

B. Medium-Range Shallow Water Systems

Medium-range systems operate in the range of 1 to 10 km, and are often required to operate in shallow water and in the presence of an extended time-varying multipath. The upper-frequency limit ranges from 10 to 100 kHz, and the channel is fully saturated, with random phase and Rayleigh amplitude fluctuation. Medium-range systems are often asked to operate with large source/receiver velocities in enclosed areas with extensive multipath structures where the line-of-sight path does not constitute a principal arrival, and in the presence of high noise levels, such as may be caused by nearby ship traffic or the bustle of a marine worksite.

The performance limitations of medium range systems are due to synchronization and equalization.

1) Synchronization: The synchronizer functions to provide a bit start-time reference to the receiver. Many communication protocols rely on the data stream itself to provide synchronization. A least-squares optimal technique for synchronization tracking is the delay lock loop (DLL), and the device is implemented in many demanding communication systems. Its performance analysis for the AWGN environment with both coherent reception and incoherent reception is well understood. The principal areas of concern are the tracking error variance, mean time to lose lock (MTTLL), and the mean lock acquisition time.

Channel multipath poses difficult problems to the synchronizer system, particularly the time-variant, dynamic multipath structures typically encountered in the ocean. If there is no discernable first or "principal" arrival, the definition of a single time of arrival instant can be problematic. For example, consider the case of two distinct, independently fading arrivals; there are several plausible ways of representing the synchronization instant, such as the first arrival, largest arrival, least-squares amplitude-weighted average of the two arrival times, etc. The synchronization choice must reflect the operation requirements of the later receiver stages, as it directly affects the equalizer and demodulator performance, among others. The synchronizer generally needs to be preceded or operate in conjunction with a multipath estimator and/or equalizer. As will be discussed, synchronizers with adaptive equalizers and the joint estimation of both sets of parameters is a part of this invention.

The classical solution is to synchronize on the first arrival. Most equalizer derivations assume synchronization on the first arrival, and a formulation for time-delay estimation in the presence of multipath exists, assuming a stable first arrival. A problem occurs if the first arrival undergoes an extended fade or disappears entirely.

Synchronizing on a weighted sum of all the arrivals does produce a stable time-delay estimate, but a change in any single path affects the entire estimate, and the impulse-response dynamics are accentuated, leading to equalizer convergence problems.

Synchronizing on a principal arrival is equivalent to tracking the first arrival, and system performance is improved if the tracked arrival is selected as the most stable component of the impulse response. Tracking multiple components of the impulse response independently, with the goal of providing a stable estimate in the event of a principal path disappearance, is a promising method.

2) Equalization and Multipath Processing: Adaptive channel equalization was developed for use on telephone lines that are fundamentally different from the ocean acoustic channel, because their impulse response is relatively stationary in time and there are no fluctuations in the received signal. A straightforward application of an adaptive equalizer is likely to encounter equalizer convergence problems as it tries to keep up with the dynamic ocean multipath field.

The convergence rate of the Kalman equalizer, generally recognized as the fastest converging adaptive equalizer, is given by $$\epsilon_{n+1} = \left(1 - \frac{1}{\rho N}\right)\epsilon_n + \left(\frac{1}{\rho N}\right)\epsilon_{opt}$$

where p is the peak-to-rms-eigenvalue ratio of the equalizer input covariance matrix, and N is the number of data frames affected by the multipath. During the convergence period, the equalizer is in a "training" mode, operating with a known data sequence. In practice, the equalizer requires at least 10 iterations to converge, with each iteration requiring roughly one impulse-response data duration. A rough test of the Kalman equalizer suitability is whether the channel changes with a fluctuation rate faster than ten impulse response durations. Unfortunately, this condition often occurs in underwater acoustics, particularly in moving source-moving receiver implementations in shallow water. The equalizer formulation also assumes that the channel propagation time is fixed; i.e., that there is an unambiguous synchronization time to which the equalizer is referenced. Again, this assumption is often not valid.

The fundamental limit to equalizer use is the algorithm convergence rate. In practice, even the most complex equalizers are realizable on currently available hardware. This encourages exploring of algorithms that are considered too computationally intensive for other uses. In particular, ML equalization techniques are capable of high-resolution parameter estimation from short data sequences, and relatively efficient computational methods for ML equalizer implementation exist as seen in the following articles: M. Feder and E. Weinstein, "Parameter estimation of superimposed signals using the EM algorithm," IEEE Trans, Acoust., Speech, Signal Processing, vol. 36, pp. 477–489, April 1988 and M. Segal and E. Weinstein, "Spatial and spectral parameter estimation of multiple source signals," in Proc. ICASSP '89 (Glasgow, UK), April 1989, pp. 2665–2668.

Equalization and echo processing in a slowly fading multipath channel can yield a data improvement over an equivalent channel without multipath by taking advantage of the implicit diversity inherent in independent signal fluctuations along each ocean path. An early example for this behavior for the case where multipath does not cause intersymbol interference is the RAKE receiver. A question of current concern is the; definition of a channel-stability threshold below which optimal multipath processing of an ISI channel yields performance superior to the system employing a single arrival for example, through the angle of arrival discrimination.

C. Short-Range Systems

This section comprises the acoustic channels with relatively mild phase fluctuations over which transmission methods developed for telephone channels are feasible. Such channels encompass many vertical deepwater paths and very short-range (less than 200 m) horizontal paths. In this case, relatively simple techniques yield high data rates, but the resultant systems are susceptible to phase fluctuations and dynamic multipath largely because of carrier phase-tracking problems.

In summary, the two principal impediments to underwater acoustic telemetry are the spatial variability of the acoustic pressure field in the channel, and the channel temporal fluctuation rate. This is one of the few communication channels where the channel characteristics do not change slowly compared to the symbol rate.

Many other channel features such as the details of the amplitude/phase scintillation and the difficulty of frame synchronization in a spread channel are problems.

D. Coherent Modulated Systems

In the past, coherent modulated systems suffered significantly from channel fluctuations. As will be appreciated, coherent modulated systems fall into two categories: The very short-range systems where several hundred kHz of bandwidth is available, and the long-range ocean-basin systems where the bandwidth is limited to hundreds of Hz and the system is severely power-limited. While vertical or near-vertical deep-ocean paths can support coherently modulated telemetry, at least under normal channel conditions, until the present invention, coherent modulated horizontally oriented systems could not be readily implemented to operate at high data rates in the presence of even moderate channel fluctuation level.

Coherent system performance in fluctuating channels has been a subject of much research and while rigorous performance bounds are not available, as will be seen, the subject invention describes an effective robust system that not only is possible but has been implemented.

Moreover, while long-range acoustic data telemetry suffers from high-power requirements to overcome relatively high ambient-noise levels and transmission loss; and while in practice, it is often simpler to deploy a surface-penetrating link and a high-speed satellite link, the subject system in large part solves the power-related problems associated with long range such that the transmit power requirement can be substantially reduced.

SUMMARY OF THE INVENTION

In order to achieve much improved underwater communications in an underwater acoustic communications system, high data rates are achieved through the use of coherent modulation and demodulation made possible through the use of rapid Doppler removal, a specialized sample timing control technique and decision feedback equalization including feedforward and feedback equalizers. The combined use of these techniques drammatically increases data rates by one and sometimes two orders of magnitude over traditional slower FSK systems. As one example, in the Code Alert communication system for submarines, the FSK symbol rate could not exceed 10 bits/second due to acoustic channel behavior. The subject system on the other hand has demonstrated at least in order of magnitude improvement for narrow bandwidth. The subject system sucessfully combats fading and multipath problems associated with a rapidly changing underwater acoustic channel that produces intersymbol interference and makes timing optimization for the sampling of incomming data difficult. The most troublesome additional problems overcome by the subject system are the effects of turbulence and relative motion between transmitter and receiver causing unwanted Doppler shifts.

In one embodiment, rather than using traditional FSK, phase shift keying (PSK) is used. The result of using PSK and the above signal processing techniques within the data receiver is increased reliability, exceptionally high data rates, a power requirement reduced by 5, and about 10 times the bandwidth efficiency. In one embodiment rapid convergence for the equalizers so that they can track rapid channel change is made possible by the addition of noise filtering and working at baseband, in combination with rapid Doppler removal using a second order phase locked loop, and sample timing control using a timing synchronizer. The synchronizer is coupled to an interpolator and resampler for digitally adjusting the sampling interval.

Specifically, in one embodiment an input signal containing the data is filtered by a bandpass filter to remove noise, with the analog signal being converted into a digital signal after which the carrier is removed to provide a baseband signal.

The baseband signal is sampled by a sampling system which adjusts the sampling rate to correspond to the detected data rate. This is accomplished through the use of a synchronizing system controlled by a feedforward equalizer, and is a first order approach at removing the effects of Doppler shift. In operation, if the intersymbol spacing is stretched out because a receiver is moving away from the transmitter, the sample rate is slowed down such that the sampling interval matches the time between received symbols.

In a digital system changing the sampling interval is a non-trivial problem. It is solved in the subject system through the use of an interpolator and resampler which operates as follows. If one seeks to elongate the sampling interval to match the stretched out interval between received symbols, the interpolator interpolates with a larger interpolating constant and resamples, with the desired result being a constant amount of information per symbol. In a typical 4 phase PSK system, at minimum two samples per symbol are required, although this number can increase depending on the application.

The data rate of the incoming signal is detected by a feedforward equalizer in the form of a transversal filter, with its taps updated using the RLS algorithm described by John G. Proakis in a paper entitled "Adaptive Equalization Techniques For Acoustic Telemetry Channels", IEE Jour. of Oceanic Engineering, Vol. 16, No. 1, January 1991, pps. 26-27, FIGS. 7 and 8 and Table V, which describes both feedforward and feedback RLS Lattice DFE algorithms. This article incorporated herein by reference and is available as microfiche Appendix A hereto.

The feedforward equalizer in combination with the sampling interval control circuit removes as much multipath and Doppler as it can. However, there is still residual Doppler which must be eliminated; and for this purpose a Doppler estimator is employed to measure the residual Doppler and remove it. In one embodiment the Doppler estimator uses a standard second order phase locked loop (PLL) algorithm with its output used to directly cancel out Doppler induced phase errors in the sampled input signal.

Having removed Doppler from consideration, a feedback equalizer is used to cancel the intersymbol interference from previously detected symbols. The error signal used to adjust the coefficients of the feedback equalizer results in equalizer coefficients that are estimates of the channel-induced intersymbol interference. It will be noted that channel induced interference refers to changes in Phase and amplitude of received signals caused by multipath, thermals, wave action, turbulence and speed of propagation changes.

The error signal is generated as a result of the convergence of the equalizer as it operates first on a known symbol set in a training cycle or mode, and thereafter on the detected symbols themselves.

In order to initialize the receiver with a training sequence, the transmitted data is transmitted in packets, with 20-50 training symbols preceding the data. The feedback equalizer is first provided with coefficients based on the comparison of received data corresponding to the known symbol set, with the known symbol set stored at the receiver. The coefficient adjustment algorithm is based on a recursive least squares (RLS) criterion and is described in the paper appended hereto as microfiche Appendix A. The RLS algorithm is a computationally intensive and complex method for adjusting the equalizer coefficients that provides rapid convergence compared with the well-known simpler and slower-converging LMS algorithm.

The feedforward equalizer is also in the form of a transversal filter updated using the aforementioned RLS algorithm.

Both equalizers operate on previously detected signals in the decision-directed mode and on known data symbols in the training mode. The tap weights of both equalizers form the composite tap-weight vector which is updated by the overall error in the RLS algorithm. The data vector it uses consists of the input signal samples with corrected phase and previously detected signals.

The entire feedforward and feedback equalizer system provides substantially error free data to a symbol detector used as a decision device to decide finally what phase was actually transmitted.

For instance, if the phases are 0°, 90°, 180° and 270°, then a received signal with 10° phase is considered to be 0°. This phase jitter corrected output is then coupled to a standard decoder for further error detection and correction.

As an example of the improvement associated with phase coherent modulation in combination with improved timing synchronization, in a long-range scenario where only 10 bits/second could reliably be transmitted with the subject system this is raised to 660 bits/second over 110 nautical miles. The bit rate goes up dramatically for short range to 20,000 bits/second even though short range, shallow depth channels have severe problems due to turbulence, multipath and Doppler. Not only is the data rate improved by an order of magnitude, power requirements are dropped to one-fifth, whereas bandwidth efficiencies are improved by a factor of ten.

Further improvements in performance are achieved by the use of coding and decoding. In particular, coded modulation in which the code is embedded or integrated into the modulated symbols at the modulator provides an additional power savings of 3 dB to 6 dB without an reduction in the data rate. Coding and decoding may also be used to provide conventional error detection and error correction. The latter form of coding and decoding also provides a power savings but at a sacrifice, i.e., a reduced data rate.

From the point of view of combined optimization of synchronization and equalization techniques, the optimum maximum likelihood receiver for joint estimation of synchronization parameters and the data sequence is difficult to implement in the case of a fading, time dispersive channel. Besides requiring the complete knowledge of the channel impulse response, which not only is generally unknown, but is actually time varying the complexity of such receiver grows exponentially with the length of the channel response, making it impractical for high symbol rates when the channel response spans tens of symbol intervals.

To circumvent these problems, the subject invention is directed to a receiver using a suboptimum structure with a decision feedback equalizer (DFE). The performance of a DFE in the absence of decision errors is comparable to that of an optimal, maximum likelihood (ML) sequence estimator. The equalizer tap weights are estimated jointly with the synchronization parameters using the minimum mean squared error (MSE) criterion. Since the parameters to be estimated are not constant in practice, the subject system operates in an adaptive, decision directed mode.

BRIEF DESCRIPTION OF THE DRAWINGS

These and other features of the subject invention will be better understood in conjunction with the Detailed Description taken in conjunction with the Drawings of which

DETAILED DESCRIPTION

The derivation of the receiver algorithm, and the experimental results of its application to the long range underwater acoustic (UWA) telemetry data is now presented.

Figure 1:
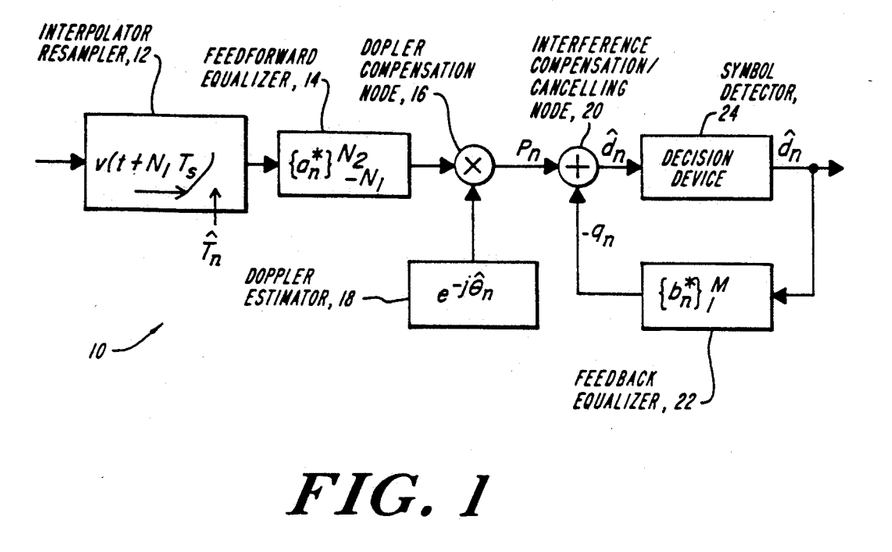
FIG. 1 is a block diagram of the receiver structure permitting improvements in underwater data communications, indicating a feedforward section of an equalizer, a feedback section of the equalizer and generation of estimation error to provide an analog estimate of the data signal.

Referring now to FIG. 1, the data receiver 10 can in general be viewed as including an interpolator/resampling module 12 which is coupled to a feedforward equalizer 14 that is in turn coupled to a Doppler compensation node 16 fed via a Doppler estimator 18. The Doppler compensated output of node 16 is applied to one of the two inputs to an interference compensation node 20 driven by a feedback equalizer 22. The output of node is coupled to a symbol detector 24 which serves as a decision device to provide a final determination of the phase of a signal so that accurate symbol determination can be made.

For a generalized perspective, the received signal, for a general class of linear modulations, is represented in its equivalent complex baseband form as $$v(t) = \sum_n d_n h(t - nT - \tau)e^{j\theta} + \tilde{v}(t), \quad t \in T_{obs} \quad (1)$$

where $[d_n]$ is the data sequence, T is the symbol duration, h(t) is the overall channel impulse response, and v(t) is white Gaussian noise. It is initially assumed that the carrier phase $\theta$, symbol delay $\tau$ and the channel response h(t) are constant during the observation interval $T_{obs}$. The structure of the receiver is shown in FIG. 1. Since the channel is not known, the matched filter h*(−t) is omitted, and the received signal v(t) is sampled directly. Sampling at the equalizer input may be performed at the symbol rate, in which case the existence of an accurate symbol timing phase estimate is crucial for the satisfactory performance of the equalizer. On the other hand, a fractionally spaced (FS) equalizer, which uses a sampling interval smaller than the reciprocal of the signal bandwidth, is capable of synthesizing the optimal sampling instant, provided that the coarse synchronization exists. Although a FS equalizer is the present choice for implementation, for the sake of generality the derivation the estimation of symbol delay is included.

The sequence of input signal samples is fed into the feedforward or linear part of the equalizer. After compensation for the carrier phase by the amount $\hat{\theta}$, the signal is fed into the feedback section (decision device and feedback equalizer) of the receiver. Let a' and b' denote the row vectors of N feedforward and M feedback equalizer taps respectively. The input signal is conveniently represented in vector notations v(n, $\hat{\tau}) = [v(nT+N_1T_s+\hat{\tau}) \ldots v_n(nT-N_2T_s+\hat{\tau})]^T$, where $(.)^T$ and $(.)'$ denote transpose, and conjugate transpose respectively. The (analog) estimate of the data symbol is obtained as $$\tilde{d}_n = a'v(n,\hat{\tau})e^{-j\hat{\theta}} - b'\tilde{d}(n) \quad (2)$$

where $d(n) = [\tilde{d}_{n-1} \ldots \tilde{d}_{n-M}]^T$ is the vector of M previous decisions which are currently stored in the feedback section of the equalizer. The decision $\hat{d}_n$ is obtained by quantizing the estimate $\tilde{d}_n$ to the nearest symbol value. The estimation error is defined as $e_n = \tilde{d}_n - \hat{d}_n$, and the optimization of the receiver parameters is performed through minimization of the MSE with respect to all the relevant parameters. Substituting the expression (2) for $\tilde{d}_n$ in the expression for the MSE, it is shown that the MSE is given by $$E = E\{|e_n|^2\} = E\{|d_n|^2\} - 2Re\{a'E\{v(n,\hat{\tau})d_n^*\}e^{-j\hat{\theta}}\} + \quad (3)$$
$$+ 2Re\{b'E\{\tilde{d}(n)d_n^*\}\} + a'E\{v(n,\hat{\tau})v'(n,\hat{\tau})\}a -$$
$$- 2Re\{a'E\{v(n,\hat{\tau})\tilde{d}'(n)\}be^{-j\hat{\theta}}\} + b'E\{\tilde{d}(n)\tilde{d}'(n)\}b.$$

Differentiating the expression for MSE with respect to the equalizer coefficients a, b, and the synchronization parameters $\hat{\theta}$, $\hat{\tau}$, results in the set of gradients $$\frac{\partial E}{\partial a} = -2E\{v(n,\hat{\tau})e_n^*\}e^{-j\hat{\theta}} \quad \frac{\partial E}{\partial b} = 2E\{\tilde{d}(n)e_n^*\} \quad (4)$$

$$\frac{\partial E}{\partial \hat{\theta}} = -2Im\{E\{p_n(d_n + q_n)^*\}\} \quad \frac{\partial E}{\partial \hat{\tau}} = -2Re\{E\{\dot{p}_n e_n^*\}\} \quad (5)$$

where $p_n = a'y(n,\hat{\tau})e^{-j\hat{\theta}}$ is the output of the feedforward section with corrected phase $q_n = b'\tilde{d}(n)$ is the output of the feedback section, a $\dot{p}_n = a'\dot{v}(n,\tau)e^{-j\hat{\theta}}$ is the output of the feedforward section with the corrected phase when its input is the time derivative of the received signal, $\dot{v}(t)$, and $\tilde{d}_n = p_n - q_n$. In the decision directed mode, $d_n$ should be substituted by $\hat{d}_n$.

Setting the gradients equal to zero results in the set of equations whose solution represents the jointly optimum receiver parameters. Although this solution does not exist in the closed form, it could be obtained numerically. However, since the channel is actually time varying, so are the optimum values of the receiver parameters. Therefore, one seeks to obtain the solution to the above system of equations in a recursive manner. Then one can expect that once the algorithm has converged, it will continue to track the time variations of the channel. A commonly used form of an adaptive algorithm is obtained through the use of stochastic gradient approximation. The simplest form of this solution is the so-called LMS algorithm, in which each parameter is updated by the amount proportional to the instantaneous estimate of its gradient. Such an algorithm, however, may not be powerful enough to track all the fluctuations present in the underwater acoustic channel.

In order to design a robust algorithm that is suitable for the time variations of the underwater acoustic channel, several improvements are introduced. Considering first the synchronization parameters update, and in particular the update equation for the carrier phase estimate, with similar conclusions applying to the symbol delay estimate update due to the similarities between the two equations, in order to obtain improved tracking capabilities of carrier phase estimate, a second order update equation for this parameter is introduced. This is obtained when it is recognized that the gradient of the MSE with respect to carrier phase estimate is proportional to the output of an equivalent phase detector. Indeed, if there were no ISI, the value of the MSE gradient with respect to $\theta$ would be proportional to $\sin(\theta_n - \hat{\theta}_n)$, which represents exactly the phase detector output of a digital PLL. Based on the analogy with the digital PLL, but using the expression (5), the equivalent phase detector output is defined as $\Phi_n = \text{Im}[p_n(d_n + q_n)^*]$. The second order carrier phase update equation is then given as $$\hat{\theta}_{n+1} = \hat{\theta}_n + K_{\theta 1}\Phi_n + K_{\theta 2}\sum_{i=0}^{n}\Phi_i \qquad (6)$$

where $K_{\theta 1}K_{\theta 2}$ are the proportional and integral tracking constants. In the absence of ISI and decision errors, the synchronization parameters update equations describe the operation of classical second order synchronization loops. Here however, they are coupled with the process of equalization. In particular it is interesting to note that the MSE gradient with respect to $\theta$ requires knowledge both of the outputs of the feedforward and the feedback section of the equalizer, while in the case of marginal estimation it would require knowledge only of the input signal and the detected symbol.

In order to achieve faster convergence of the algorithm during relatively short training periods, the recursive least squares (RLS) estimation criterion is used for the equalizer tap coefficients update. To accommodate for the time variations of the channel, windowing of the data can be introduced through a forgetting factor, denoted by $\lambda$.

Looking at the structure of the receiver, it can be seen that it allows carrier phase recovery to take place after the feedforward equalization, thus eliminating the problem of delay in the carrier phase estimate. However, this is not the case with the symbol delay estimation, with the consequence of having residual timing jitter. An FS equalizer, by virtue of being insensitive to the choice of the sampling instant, does not require estimation of the precise symbol timing, and automatically overcomes this problem. The algorithm operates only on 2 samples per symbol interval, and since no feedback to the analog part of the receiver is required, it is well suited for an all digital implementation. However, the use of finer fractional tap spacing is also possible, although it is unnecessary.

The presented system was tested and proved efficient on the real long range underwater acoustic telemetry data. Some of the results are presented hereinafter.

EXPERIMENTAL RESULTS

The analyses were performed using data collected during an experiment conducted by the Woods Hole Oceanographic Institution off the coast of California in January 1991. The modulation format used in the experiment is QPSK and 8-QAM, with data rates ranging from 3 to 300 symbols per second. In the experiment a 100 watt transmitter at a carrier frequency of 1 kHz transmitted Packets with an intersymbol interval of 1 msec to 1 sec corresponding to a maximum data rate of 1000 bits/sec, with nominal sampling rate of 4 kHz.

Bandwidth efficiency is achieved by cosine roll-off pulse shaping of the signal at the transmitter by a cosine roll-off filter with roll-off factor 0.5 and truncation length $\pm 2$ symbol intervals. The data were transmitted over ranges of approximately 40-140 nautical miles, and received with a vertical hydrophone array of 12 sensors spanning depth of 1500 m.

Figure 2:
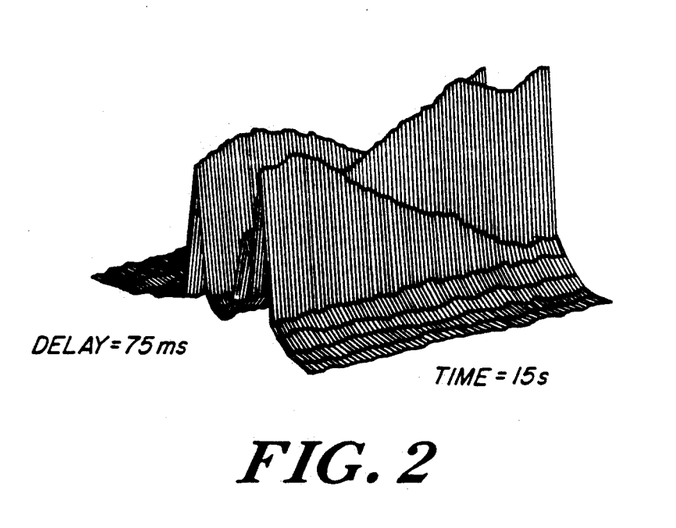
FIG. 2 is a graphical diagram of an ensemble of channel responses at 110 nautical miles which is the result of RLS-estimation.
Figure 3A:
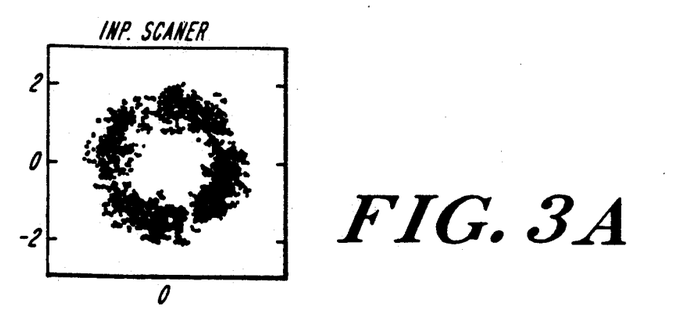
FIGS. 3A, B, C and D are graphs of the results for QPSK, 33 symbols per second, 80 nautical miles for receiver parameters N=8, M=2, $\lambda=0.99$, $K_{\theta 1}=0.01$; $K_{\theta 2}=0.001$.
Figure 3B:
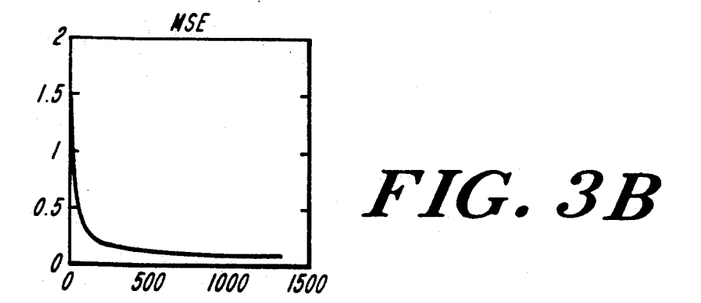
Figure 3C:
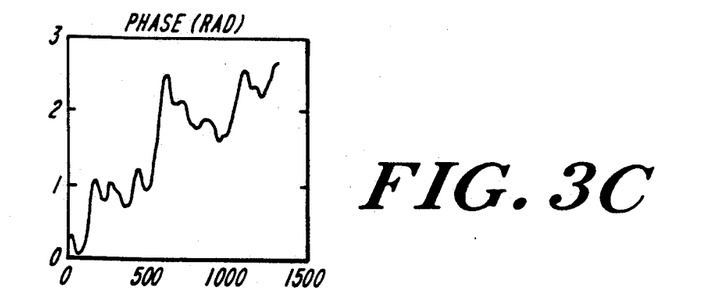
Figure 3D:
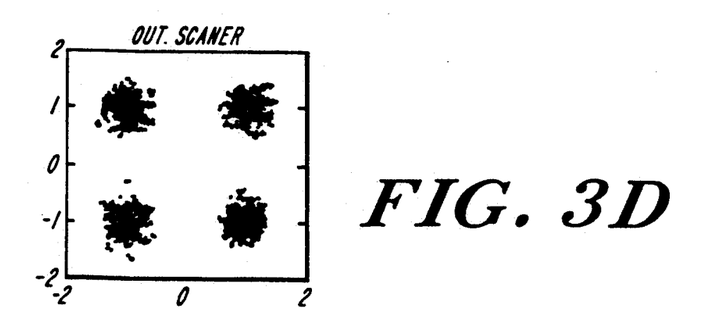
Figure 4A:
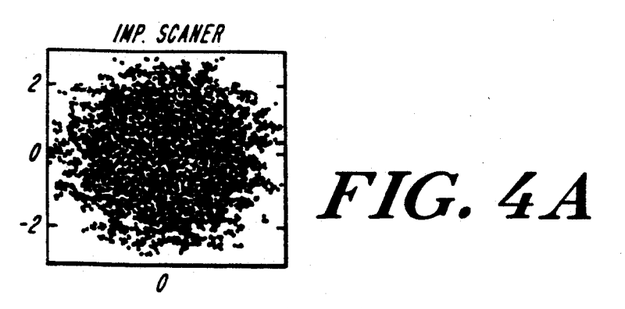
FIGS. 4A, B, C, and D are graphs of the results for QPSK, 333 symbols/sec., 110 nautical miles for receiver parameters N=40, M=10, $\lambda=0.99$, $K_{\theta 1}=0.001$, $K_{\theta 2}=0.0001$.
Figure 4B:
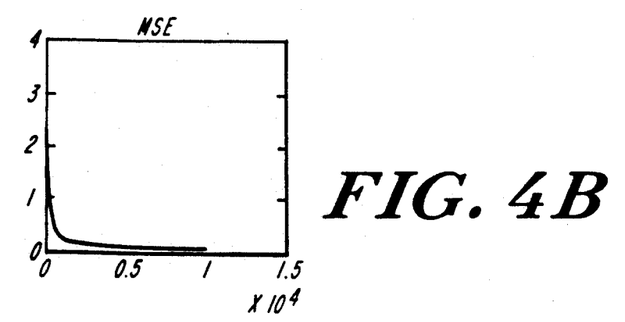
Figure 4C:
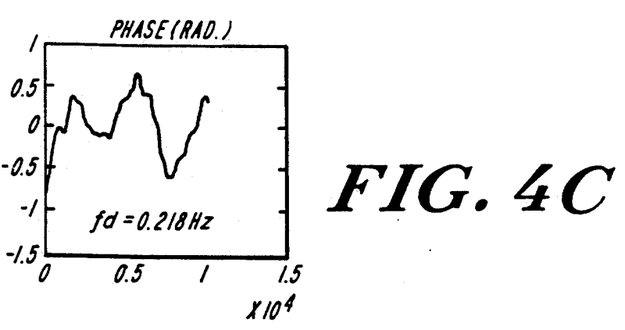
Figure 4D:
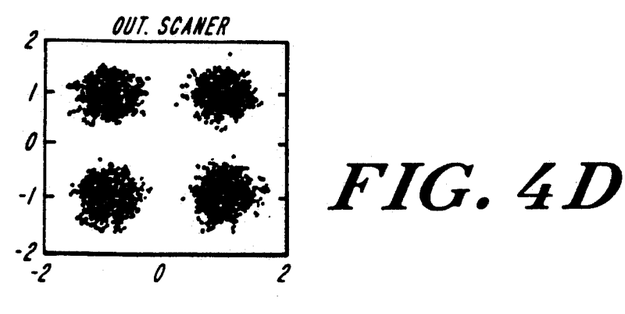

In order to gain insight into the multipath and fading characteristics of the channel, a series of analyses with channel estimation was first performed. FIG. 2 represents an example of the ensemble of channel impulse responses obtained by an RLS-based adaptive channel estimator. It refers to the transmission over 110 nautical miles, and shows that the overall multipath spread is on the order of 60 ms, while significant time variations of the channel response due to fading can occur in time intervals less than 10 s.

Two examples of different rate and range transmissions were chosen, for which the results of the application of the presented algorithm are shown in FIGS. 3 and 4. FIG. 3 shows the results obtained with QPSK (four phase PSK) signals transmitted at the rate of 33 symbols per second, over 80 nautical miles. The first plot represents the scatter plot of the received signal after compensation for the constant Doppler frequency shift in the received signal. Although there is not much ISI present here, the phase fluctuations are considerable. The SNR in this case was on the order of 25 dB. Shown in the remaining plots are the mean squared error, which indicates the convergence of the algorithm, and the carrier phase estimate, both as a function of time measured in symbol intervals. It is seen that significant changes in the carrier phase occur in time intervals of only couple of symbols. The last plot is the scatter plot of the output signal on which the decisions are performed, in this case with no errors. The fractional spacing of T/2 was used in all the cases, since it is sufficient for the signal bandwidth of $\frac{3}{4}T$. We have found by trial that the choice of the RLS forgetting factor, $\lambda = 0.99$, and the choice of the integral phase tracking constant 10 times smaller than the proportional tracking constant, resulted in satisfactory performance.

FIG. 4 presents results for QPSK signal transmitted at the rate 333 symbols per second over 110 nautical miles. In this case the eye is initially completely closed due to the ISI, phase fluctuations and noise. The SNR is on the order of 15 dB. Since the signaling rate is relatively high, the ISI spans at least 20 symbol intervals. The algorithm successfully copes both with the ISI and phase fluctuations, as can be seen from the output scatter plot.

Satisfactory results were also obtained with 8 QAM and 8 PSK signal constellations.

Noise levels in general are higher at lower depths, as well as for longer distances. However, although the noise level increases with range, so does the number of multiple arrivals, and it was observed that a correctly positioned receiver may actually perform better at longer distances due to the fact that it makes use of the implicit diversity present in the multipath propagation.

Improved performance with respect to noise and fading can also be achieved through the use of spatial diversity, and the proposed algorithm is suitable for the extension to the multichannel case in which signals from multiple hydrophones are combined.

In order to achieve reliable coherent communications over long range underwater acoustic channels, a receiver algorithm which jointly performs synchronization and decision feedback equalization of the received signal is presented hereinafter. The algorithm was applied to the experimental data transmitted at rates as high as 333 symbols per second over ranges up to 140 nautical miles. The results assert the feasibility of coherent communications over underwater acoustic channels, and demonstrate the suitability of the proposed algorithm for the application in fading multipath channels with long impulse responses and phase instabilities.

DETAILED EMBODIMENT

Figure 5A:
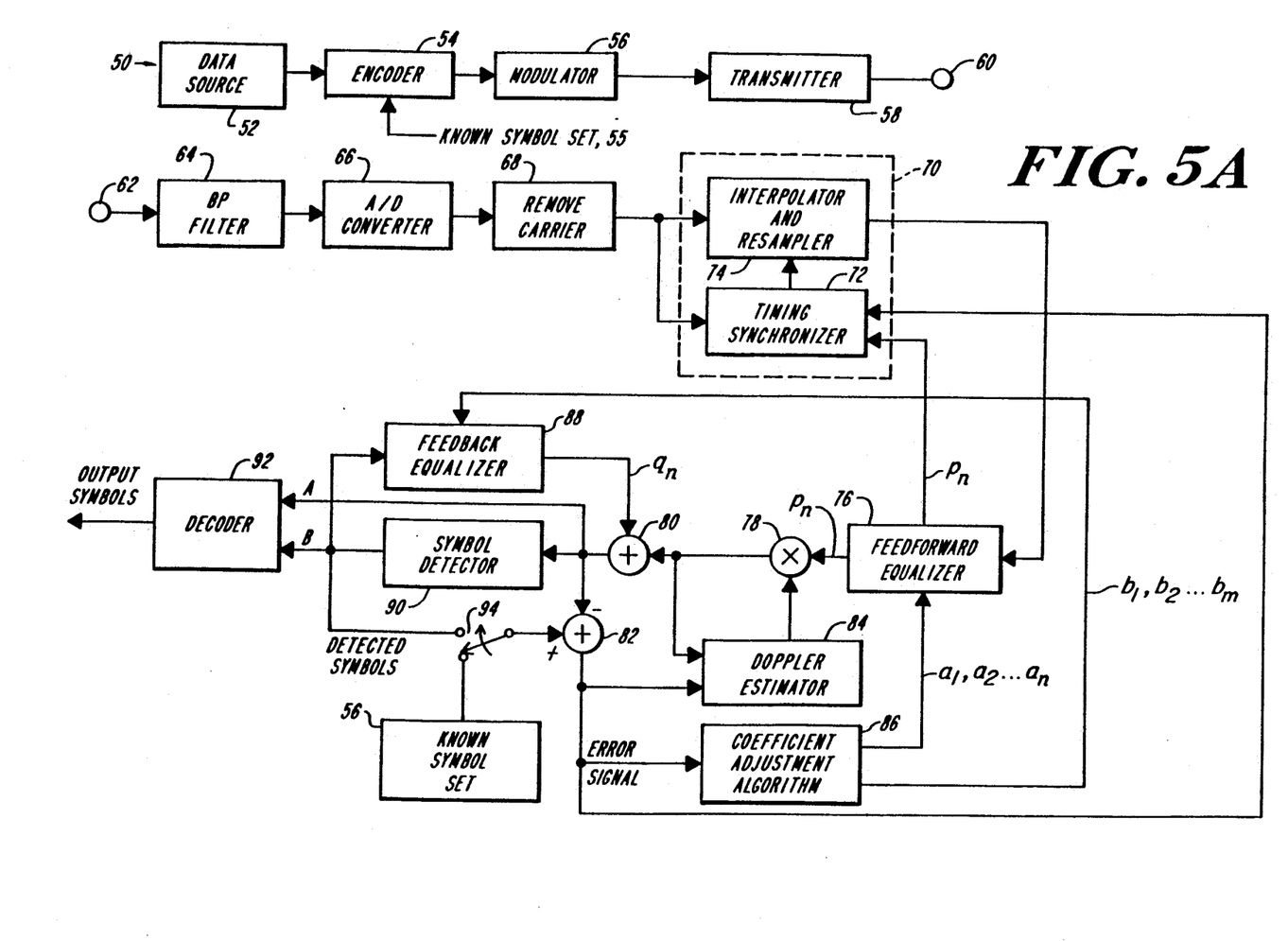
FIG. 5A is a block diagram of one embodiment of the coherent modulated and demodulated signal processing system of the subject invention.

Referring now to FIG. 5A, a block diagram of one embodiment of the subject system is presented in which a transmitter section 50 is provided with a data source 52 coupled to an encoder 54 which is in turn coupled to a modulator 56 that is coupled to transmitter 58. The output of transmitter 58 is coupled to a hydrophone 60 for the projection of acoustic data into the water in a generally horizontal direction. Encoder 54 is provided with a known symbol set 55 utilized for training purposes, or with the output of the data source 52.

The encoder 54 encodes the data to produce an integrated coded modulation signal at the output of the modulator, with decoding performed at the receiver as shown in Scenario A. The encoder 54 may also be used to provide redundancy for conventional error detection and error correction at the receiver as shown in Scenario B.

With respect to the receiver, a hydrophone 62 is coupled to a band pass filter 64, which is in turn coupled to an analog-to-digital converter 66 that is utilized to sample the analog signal which has been previously filtered. The output of the analog-to-digital converter is coupled to a circuit 68 which removes the carrier to provide a baseband signal that is coupled to a sample timing 'nd synchronization module 70. This module includes a timing synchronizer 72 and an interpolator/resampler 74 for setting the sampling interval to the detected interval that has been sensed by a feedforward equalizer 76 during its normal operation.

Figure 5B:
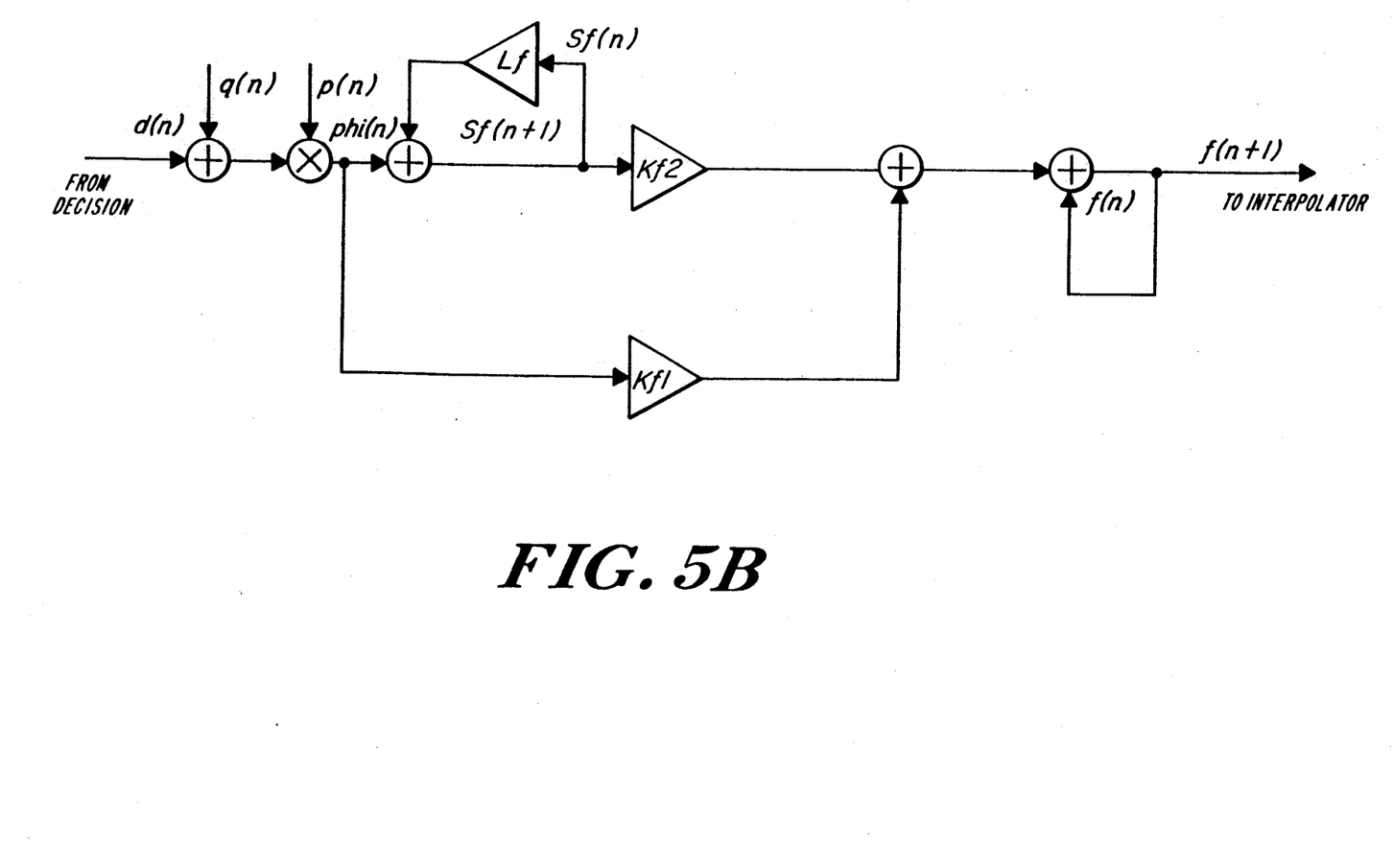
FIG. 5B is a block diagram of the Doppler estimator of the system illustrated in FIG. 5A.

Referring now back to FIG. 5A, the output of the feedforward equalizer is provided through a Doppler compensation multiplier 78, node 16 of FIG. 1, as one input to a Doppler Estimator 84. Multiplier 78 is also coupled through an interference cancelling summing junction 80, node 20 of FIG. 1, and through a differential summing junction 82 to the other of the inputs to Doppler estimator 84. One input to summing junction 82 is the known symbol set 56 which is compared to a coarsely compensated signal. One embodiment of the Doppler estimator is shown in FIG. 5B.

The output of summing junction 82 is an error signal coupled to a coefficient generator 86 which generates adjusted coefficients in accordance with the RLS algorithm. The coefficient update equation may be expressed as $$c(n)=c(n-1)+k(n)e(n)$$

where $e(n)$ is the error signal, $c(n)$ is the updated combined equalizer coefficient vector, $c(n-1)$ is the previous coefficient vector and $k(n)$ is a vector that is computed based on the RLS criterion as described in microfiche Appendix A.

The corrected or adjusted coefficients are applied as tap weights to feedforward equalizer 76 and a feedback equalizer 88 coupled to the output of a symbol detector module 90 that derives its output from summing junction 80.

Note that junction 80 is coupled directly to a data decoder 92 in the case of Scenario A for embedded coded modulation symbols, whereas the input to decoder 92 is from symbol detector 90 for Scenario B for conventional coded transmissions.

After the training sequence, a switch 94 switches the corresponding input of junction 82 to the output of symbol detector 90 to receive detected symbols as opposed to the known symbol set.

Note that bandpass filter 64 is a common bandpass filter set with a passband of 600 Hz in one embodiment. The filter is designed to pass the received signal and the bandwidth of the noise to that which falls within the signal frequency band, in one embodiment 700-1300 Hz.

Analog-to-digital converter 66 is a conventional device used to sample the signal at a rate of at least twice the signal bandwidth, W. Typically the signal is sampled at four samples for a transmitted symbol, although this number can be higher.

The carrier removal circuit 68 translates the signal from a passband signal to a baseband signal by multiplying the passband signal with the sine and cosine of the carrier followed by lowpass filtering of each of the product signals. From this point on, the signal is treated as complex valued, where the real part is the output of the cosine demodulator and the imaginary part is the output of the sine demodulator.

The reason for working at baseband is as that physical hardware for a baseband realization is simpler, more power efficient and compact. However, a totally equivalent signal demodulator operating at passband or at any intermediate frequency can be implemented by a person skilled in the art of modem design.

As to timing synchronization; this is divided into three tasks: initial acquisition/synchronization, coarse synchronization and fine synchronization.

Initial acquisition/synchronization is performed by matched filtering with a known Barker code. This code is transmitted as part of the data preamble. The filter peak output is used to align the data sequence and assure the principal signal arrival coincides with the first tap of the feedforward equalizer 76.

Coarse synchronization is performed by adaptive interpolator/resampler 74 which decreases the data (sample) rate when detecting a travel time increase, and increases the rate when travel time shortens. The interpolation rate is determined by the timing synchronizer 72 which uses the tap structure of the feedforward equalizer 76 as input.

Fine synchronization is accomplished by the fractionally spaced feedforward equalizer, the algorithm of which adjusts its tap coefficients to compensate for minor delay fluctuations.

Interpolator/resampler 74 functions as follows: Typical interpolation methods include linear, quadratic, and sin (x)/x interpolation. The objective of the interpolator/resampler is to change input data rate, in samples/second, without compromising data quality. For this application, data rate changes are typically less than 10% of the data rate.

Timing synchronizer 72 is configured as follows: Timing synchronizer sets the interpolator/resampler rate by monitoring the main or largest value of the feedforward equalizer. If the main tap is slightly delayed, the synchronizer increases the interpolator/resampler rate in order to advance the main tap back into equilibrium.

As to Doppler estimator 84, this computes the carrier phase estimate once per symbol interval. The current estimate is updated by adding two terms: a term proportional to the phase error signal, and a term proportional to the sum of previous phase error signals. The Phase error signal is obtained as Im[pn(Pn+en)*], where en is the overall error and Pn is the output of the feedforward equalizer 76 with corrected phase. Note that the output of the Doppler estimator is applied back to cancel the residual Doppler. The computational algorithm is a second order phase-locked-loop with the loop coefficients $K_1$ and $K_2$ selected according to channel fluctuation rate. Note that FIG. 5B illustrates a typical implementation.

Figure 6:
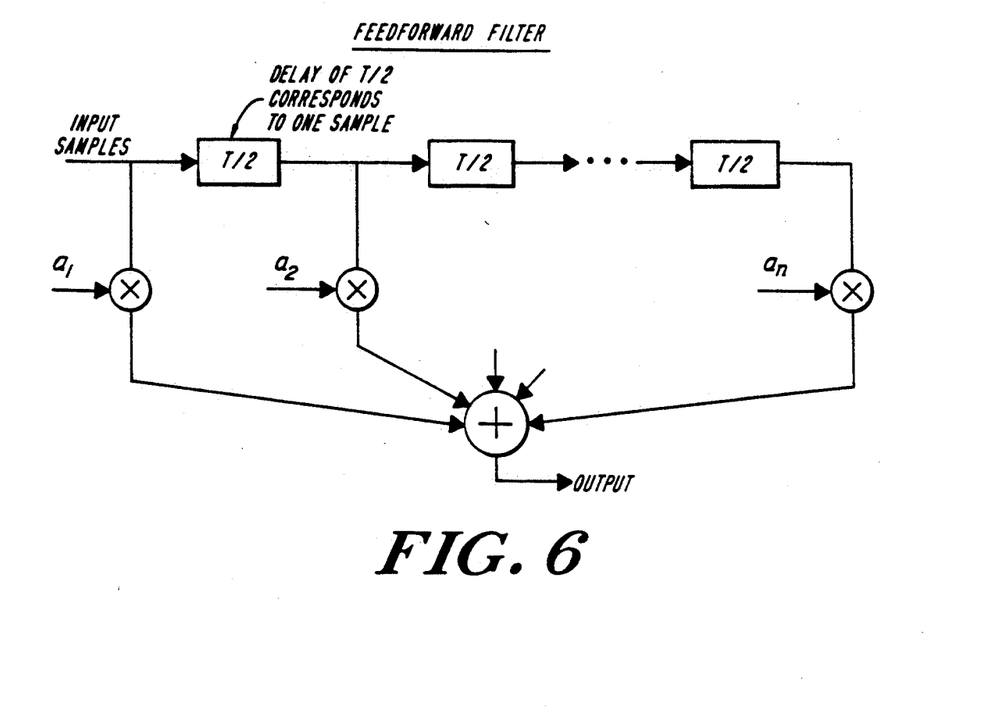
FIG. 6 is a schematic diagram of the feedforward equalizer of FIG. 5.

Feedforward equalizer 76 is shown in FIG. 6 and is described in the aforementioned article by John G. Proakis. Note that $a_1, a_2 \cdots a_n$ are the equalizer coefficients and that the output of the filter is computed once for every two input samples for T/2 fractional spacing. This equalizer operates on the sequence of T/2 (T-symbol duration) spaced samples of input signal. This is a transversal filter with total number of $N_1+N_2+1$ taps, where $TN_2$ is the delay it introduces in order to compensate for the ISI of future symbols. Its tap weights are updated together with those of the feedback filter using the RLS algorithm. Its coefficient updating algorithm as given previously is $a(n)=a(n-1)+k(n)e(n)$ and its output is given by the equation $a'(n)v(n,\hat{r})$. The purpose of the feedforward equalizer is as follows: The role of the feedforward equalizer is to weight and coherently combine the received signal multipath components and, simultaneously, to minimize the effect of intersymbol interference from future symbols, sometimes called precursors, on the current symbol that is being estimated.

Figure 7:
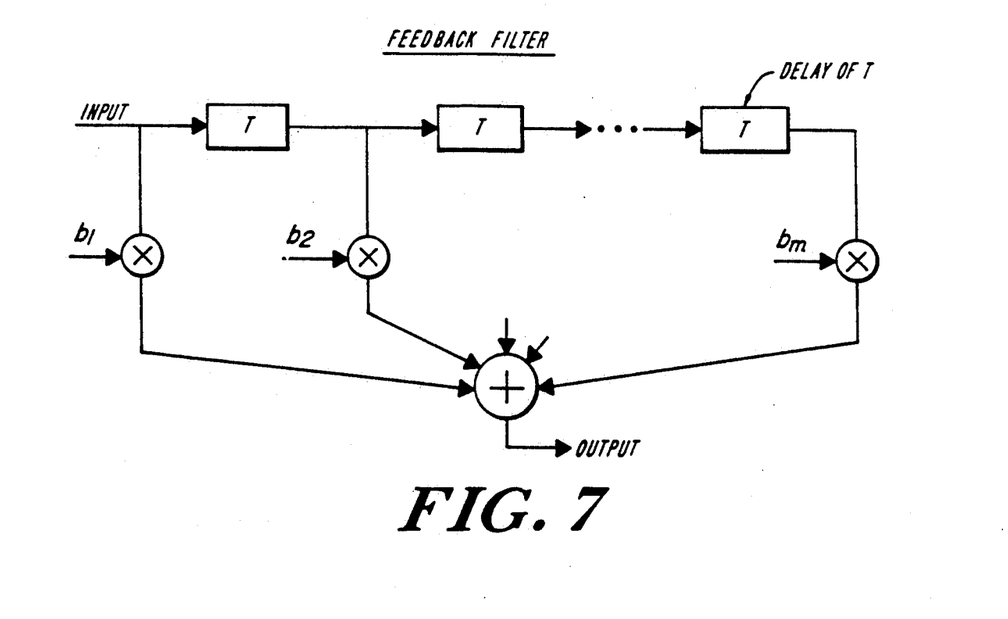
FIG. 7 is a schematic diagram of the feedback equalizer of FIG. 5.

Feedback equalizer 88 is shown in FIG. 7 where $b_1, b_2 \cdots b_m$ are the coefficients. Note, the feedback equalizer inputs are the previously detected symbols, with its output being an estimate of the ISI from past symbols. The purpose of the feedback equalizer is eliminate the intersymbol interference due to previously detected symbols from the current symbol being estimated. Its tap coefficients adapt to the ISI values contained in the channel postcursors, sometimes called the tail of the channel response.

Decoder 92 is designed to match the encoding process Produced at the transmitting end of the system. When coded modulation is used, in which the coding is embedded in the modulation, the decoder operates in Scenario A and takes its input from the output of the summing device 80. In this mode, the decoder decodes the transmitted data symbols based on computation of Euclidean distance metrics for the possible transmitted sequence of symbols. When conventional coding is performed for error detection and error correction, the decoder operates in Scenario B and takes its input from the output of the symbol detector. In this mode, the decoder decodes the data symbols based on computation of Hamming distance, which is conventionally used in decoding of block and convolutional codes.

The symbol detector 90 takes the input data estimate from the summing device 80 and maps each data symbol estimate to the closest (in Euclidean distance) possible transmitted symbol. For example, if 4-phase PSK modulation is used with possible transmitted phase 0°, 90°, 180°, 270°; a symbol estimate that falls in the range of 45° to 135° is mapped to 90°, an estimate that falls in the range of 135° to 225° is mapped to 180°, one that falls in the range of 225° to 315° is mapped to 270°; and an estimate that falls in the range of 315° to 45° is mapped to 0°. The output decisions from the symbol detector are fed to the decoder which performs conventional error detection and error correction by using the redundancy in the transmitted symbols inserted by the encoder at the transmitter.

It will be appreciated that the overall equalizer including feedforward and feedback functions is known as a decision-feedback equalizer (DFE). While the above description has included implementation of the equalizer in terms of a transversal filter, including a tapped delay line, the subject system may be implemented with a lattice DFE described in the publication of microfiche Appendix A hereto. It is also described in the book authored by John Proakis entitled "Digital Communications", McGraw Hill, Second Edition, 1989, and particularly in Chapter 6 thereof.

The program listing, written in MATLAB, for the system depicted in FIG. 5A is included herewith as microfiche Appendix B. A multichannel version of the subject system is included herewith as microfiche Appendix C.

It will also be appreciated that the type of modulation signals includes all phase coherent modulation methods including phase shift keying, amplitude shift keying, and combined PSK/ASK, known as quadrature-amplitude modulation or QAM.

Additionally, coded modulation, including block-coded and trellis-coded modulation may be used in the subject system. In both of these coded modulation schemes, the coding is embedded in the modulated symbols. These types of coding are widely used in all high speed telephone modems, and is discussed in the above book entitled "Digital Communications" in Chapter 5 thereof.

The subject system can of course utilize conventional error detection and error correction coding and decoding. This type of coding and decoding is routinely used in many communication systems. Typical codes include the Hamming codes and BCH codes, including Reed-Solomon codes.

Finally, the Barker code used for initial synchronization is but one of many possible sequences that may be used. Any sequence that has a large autocorrelation peak and very small side lobes is suitable. One example is the class of shift register sequences known as "m-sequences".

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. Apparatus for high data rate digital underwater communication over an underwater acoustic channel comprising:

means including a transmitter at a first location for horizontally transmitting a carrier modulated by a phase coherent stream of data corresponding to symbols;

means including a receiver at a second location for detecting and demodulating said stream to remove channel induced degradations in said stream, said receiver including means for decision feedback equalization, thereby to recover undegraded data in the form of symbols; and,     means for displaying said received symbols, whereby phase coherent communications is established despite an underwater acoustic channel which changes rapidly and ordinarily restricts the data rate.

2. The apparatus of claim 1 wherein said detecting and demodulating means includes in combination means for sampling said data stream to produce a sampled signal;

means for detecting the intersymbol interval of said sampled signal and for adjusting the sampling rate of said sampling means to correspond in sampling interval to that of the detected intersymbol interval; and, means for detecting Doppler shift in said carrier and for removing the effects of Doppler shift from said sampled signal to produce a Doppler removed signal; and wherein said means for decision feedback equalization includes an equalizer coupled to said Doppler removed signal for sensing the differences between a first set of received data symbols and a second and subsequent set of received data symbols and for removing said differences from said sampled signal.

3. The apparatus of claim 2 wherein said intersymbol detecting means includes a feedforward and a feedback equalizer.

4. The apparatus of claim 3 wherein said equalizers are decision feedback equalizers.

5. The apparatus of claim 2 wherein said equalizers are transversal filters.

6. The apparatus of claim 2 wherein said detecting means includes means coupled to said sampling means for removing said carrier.

7. The apparatus of claim 2 wherein said means for detecting said intersymbol interval includes a feedforward equalizer.

8. The apparatus of claim 2 wherein said means for adjusting said sampling rate includes a timing synchronizer coupled to said detecting means and an interpolator and resampler coupled to said timing synchronizer for varying the interpolator period responsive to the output of said timing synchronizer.

9. The apparatus of claim 2 and wherein said transmitter means includes means for transmitting a known set of symbols for training purposes and wherein said means for sensing the differences between said first and second sets of data includes means for developing said known symbol set as said first set, thereby to provide said detecting and demodulating means with a training cycle using a known symbol set.

10. The apparatus of claim 9 wherein said transmitting means includes means for transmitting sequential packets of data with said known symbol set embedded at a predetermined position in a packet.

11. The apparatus of claim 9 wherein said transmitting means includes means for developing a received data set of symbols as said first set.

12. The apparatus of claim 1 wherein said transmitting means includes means for phase shift keying said transmitter.

13. The apparatus of claim 12 wherein said phase shift keyed modulation is four phase.

14. The apparatus of claim 1 wherein said transmitting means includes amplitude shift keying for the carrier thereof.

15. The apparatus of claim 1 wherein the modulation of said carrier includes combined PSK/ASK modulation.

16. The apparatus of claim 15 wherein said combined PSK/ASK modulation is quadrature-amplitude modulation.

17. A high data rate underwater acoustic communications system for transmitting and receiving symbols comprising means for transmitting and receiving information between two laterally spaced locations, said information being transmitted digitally in phase coherent form, with said data rate exceeding 600 bits per second.

18. The system of claim 17 wherein said receiving means includes means for removing channel induced interference.

19. The system of claim 18 wherein said means for removing channel induced interference includes a lattice decision feedback equalizer.

20. The system of claim 19 wherein said receiver means includes symbol sampling means and wherein said means for removing channel induced interference includes means for removing the effects of Doppler from received symbols and means for matching symbol sampling intervals with received symbol sampling intervals.

* * * * *

UNITED STATES PATENT AND TRADEMARK OFFICE
CERTIFICATE OF CORRECTION

PATENT NO. : 5,301,167
DATED : April 5, 1994
INVENTOR(S) : John G. Proakis, et al It is certified that error appears in the above-indentified patent and that said Letters Patent is hereby corrected as shown below:

In column 1 after the title of the invention, insert the following new heading and paragraph as follows:

-- GOVERNMENT SUPPORT

Part of this invention was made with government support. Therefore, the U.S. Government has certain rights in this invention. --

Signed and Sealed this

Sixth Day of August, 1996

Attest:

BRUCE LEHMAN

Attesting Officer        Commissioner of Patents and Trademarks